(12) United States Patent
Baron et al.

(10) Patent No.: US 10,785,615 B2
(45) Date of Patent: Sep. 22, 2020

(54) BUDGETING AND QUOTA MANAGEMENT SYSTEM FOR DATA CONSUMPTION

(71) Applicant: Intel Corporation, Santa Clara, CA (US)

(72) Inventors: Charles Baron, Chandler, AZ (US); Sherry S. Chang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/708,577

(22) Filed: Sep. 19, 2017

(65) Prior Publication Data

US 2018/0227722 A1 Aug. 9, 2018

Related U.S. Application Data

(63) Continuation of application No. 14/125,169, filed as application No. PCT/US2013/032425 on Mar. 15, 2013, now Pat. No. 9,769,643.

(51) Int. Cl.
*H04M 11/00* (2006.01)
*H04W 4/24* (2018.01)
(Continued)

(52) U.S. Cl.
CPC ............... *H04W 4/24* (2013.01); *H04L 12/14* (2013.01); *H04M 15/28* (2013.01); *H04M 15/30* (2013.01);
(Continued)

(58) Field of Classification Search
CPC ..... H04L 63/0892; H04L 63/10; H04L 29/06; H04L 12/14; H04W 76/02; H04W 4/26;
(Continued)

(56) References Cited

U.S. PATENT DOCUMENTS 8,285,250 B2 * 10/2012 Rubin .................... H04L 47/14
455/405
8,484,568 B2 7/2013 Rados et al.
(Continued)

FOREIGN PATENT DOCUMENTS

EP 2693802 2/2014
KR 10-2004-0058791 7/2004
(Continued)

OTHER PUBLICATIONS

European Patent Office, "Search Report", issued in connection with European Patent application No. 13877633.1, dated Oct. 19, 2016, 9 pages.
(Continued)

*Primary Examiner* — Don N Vo
(74) *Attorney, Agent, or Firm* — Hanley, Flight & Zimmerman, LLC

(57) ABSTRACT

Systems and methods may provide for establishing a data usage budget based on one or more of user input and historical usage data, wherein the data usage budget distinguishes between usage types and distinguishes between connection types. Additionally, a data usage of one or more client devices may be monitored in accordance with the data usage budget. In one example, the usage types are designated as one or more of a high bandwidth usage and a low bandwidth usage, and the connection types are designated as one or more of a capped connection and a non-capped connection.

23 Claims, 6 Drawing Sheets

(51) Int. Cl.
  *H04L 12/14* (2006.01)
  *H04M 15/28* (2006.01)
  *H04M 15/00* (2006.01)
  *H04M 15/30* (2006.01)
  *H04W 4/90* (2018.01)

(52) U.S. Cl.
  CPC ........... *H04M 15/44* (2013.01); *H04M 15/58* (2013.01); *H04M 15/61* (2013.01); *H04M 15/70* (2013.01); *H04M 15/785* (2013.01); *H04M 15/8044* (2013.01); *H04M 15/8055* (2013.01); *H04M 15/8214* (2013.01); *H04M 15/83* (2013.01); *H04M 15/84* (2013.01); *H04M 15/85* (2013.01); *H04M 15/851* (2013.01); *H04M 15/852* (2013.01); *H04M 15/853* (2013.01); *H04M 15/88* (2013.01); *H04M 15/882* (2013.01); *H04W 4/90* (2018.02); *H04M 15/49* (2013.01); *H04M 2215/146* (2013.01)

(58) Field of Classification Search
  CPC ......... H04W 4/24; H04W 4/90; H04M 15/61; H04M 2215/146; H04M 15/851; H04M 15/85; H04M 15/83; H04M 15/84; H04M 15/785; H04M 15/44; H04M 15/853; H04M 15/70; H04M 15/882; H04M 15/88; H04M 15/852; H04M 15/30; H04M 15/8044; H04M 15/58; H04M 15/8055; H04M 15/8214; H04M 15/28; H04M 15/49
  USPC ................................................ 455/405–409
  See application file for complete search history.

(56) References Cited

U.S. PATENT DOCUMENTS

| | | | |
|---|---|---|---|
| 9,526,086 | B1* | 12/2016 | Barbee ................ H04L 41/5019 |
| 9,769,643 | B2 | 9/2017 | Baron et al. |
| 2001/0044786 | A1 | 11/2001 | Ishibashi |
| 2008/0019317 | A1 | 1/2008 | Vellanki et al. |
| 2009/0005002 | A1 | 1/2009 | Agarwal |
| 2009/0180430 | A1 | 7/2009 | Fadell |
| 2010/0178896 | A1 | 7/2010 | Terrero Diaz-Chiron et al. |
| 2010/0191612 | A1 | 7/2010 | Raleigh |
| 2010/0332615 | A1 | 12/2010 | Short et al. |
| 2011/0294502 | A1 | 12/2011 | Oerton |
| 2011/0306386 | A1* | 12/2011 | Centoza ................ H04W 28/08 455/552.1 |
| 2012/0089727 | A1 | 4/2012 | Raleigh et al. |
| 2012/0173367 | A1 | 7/2012 | Soroca et al. |
| 2012/0250586 | A1 | 10/2012 | Ahmavaara et al. |
| 2013/0097220 | A1 | 4/2013 | Lyons et al. |
| 2013/0100944 | A1* | 4/2013 | Kwon ................ H04W 52/028 370/338 |
| 2013/0238777 | A1 | 9/2013 | Raleigh et al. |
| 2014/0036666 | A1 | 2/2014 | Sanda et al. |
| 2014/0149562 | A1* | 5/2014 | Xiao ................... H04L 41/0879 709/222 |
| 2014/0187195 | A1* | 7/2014 | Pallares Lopez ... H04L 12/1432 455/405 |
| 2014/0204746 | A1* | 7/2014 | Sun ....................... H04W 28/08 370/235 |
| 2014/0258871 | A1 | 9/2014 | Wu et al. |

FOREIGN PATENT DOCUMENTS

| | | |
|---|---|---|
| KR | 10-2006-0065303 | 6/2006 |
| WO | 2013/036658 | 3/2013 |

OTHER PUBLICATIONS

International Searching Authority, "International Search Report and Written Opinion", issued in connection with PCT Patent application No. PCT/US2013/032425, dated Dec. 2, 2013, 13 pages.

United States Patent and Trademark Office, "Notice of Allowance", issued in connection with U.S. Appl. No. 14/125,169, dated May 12, 2017, 15 pages.

United States Patent and Trademark Office, "Advisory Action", issued in connection with U.S. Appl. No. 14/125,169, dated Dec. 29, 2016, 3 pages.

United States Patent and Trademark Office, "Final office action", issued in connection with U.S. Appl. No. 14/125,169, dated Oct. 14, 2016, 19 pages.

United States Patent and Trademark Office, "Non-Final office action", issued in connection with U.S. Appl. No. 14/125,169, dated May 13, 2016, 14 pages.

United States Patent and Trademark Office, "Advisory Action", issued in connection with U.S. Appl. No. 14/125,169, dated Mar. 4, 2016, 4 pages.

United States Patent and Trademark Office, "Final office action", issued in connection with U.S. Appl. No. 14/125,169, dated Nov. 12, 2015, 14 pages.

United States Patent and Trademark Office, "Non-Final office action", issued in connection with U.S. Appl. No. 14/125,169, dated Jun. 12, 2015, 15 pages.

International Bureau, "International Preliminary Report on Patentability", issued in connection with PCT Patent application No. PCT/US2013/032425, dated Sep. 15, 2015, 6 pages.

European Patent Office, "Communication Pursuant to Article 94(3) EPC," issued in connection with European Patent Application No. 13 877 633.1, dated Jun. 22, 2018, 6 pages.

European Patent Office, "Extended European Search Report," issued in connection with European Patent Application No. 19151702.8, dated May 8, 2019, 10 pages.

European Patent Office, "Communication under Rule 71(3) EPC," mailed in connection with European Patent Application No. 19151702.8, dated Apr. 9, 2020, 8 pages.

\* cited by examiner

FIG. 3A
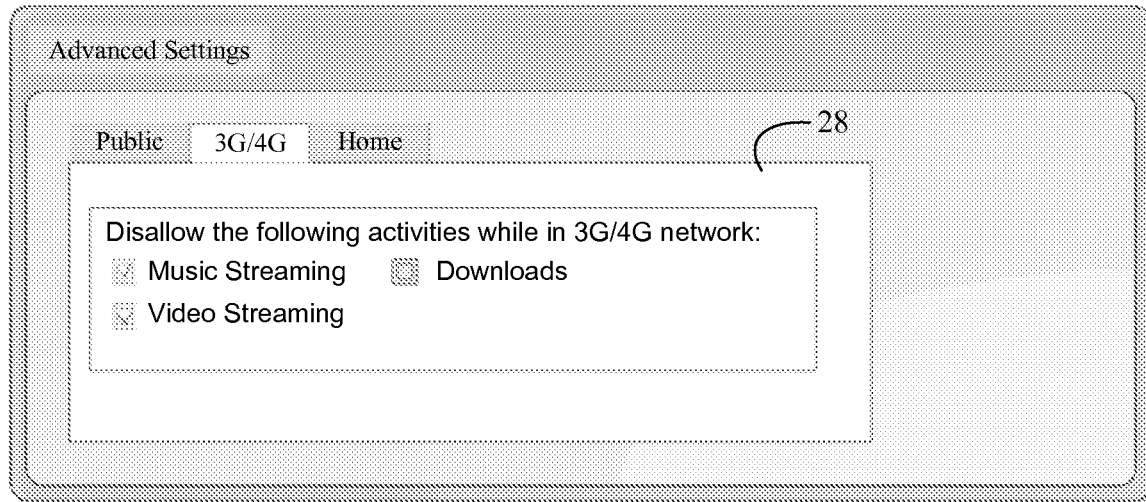
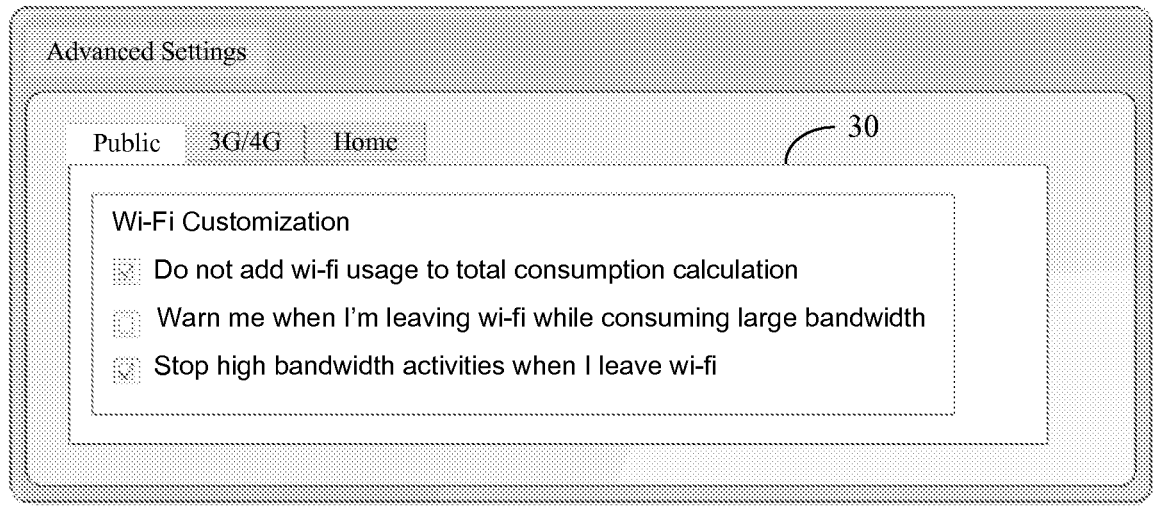
FIG. 3B

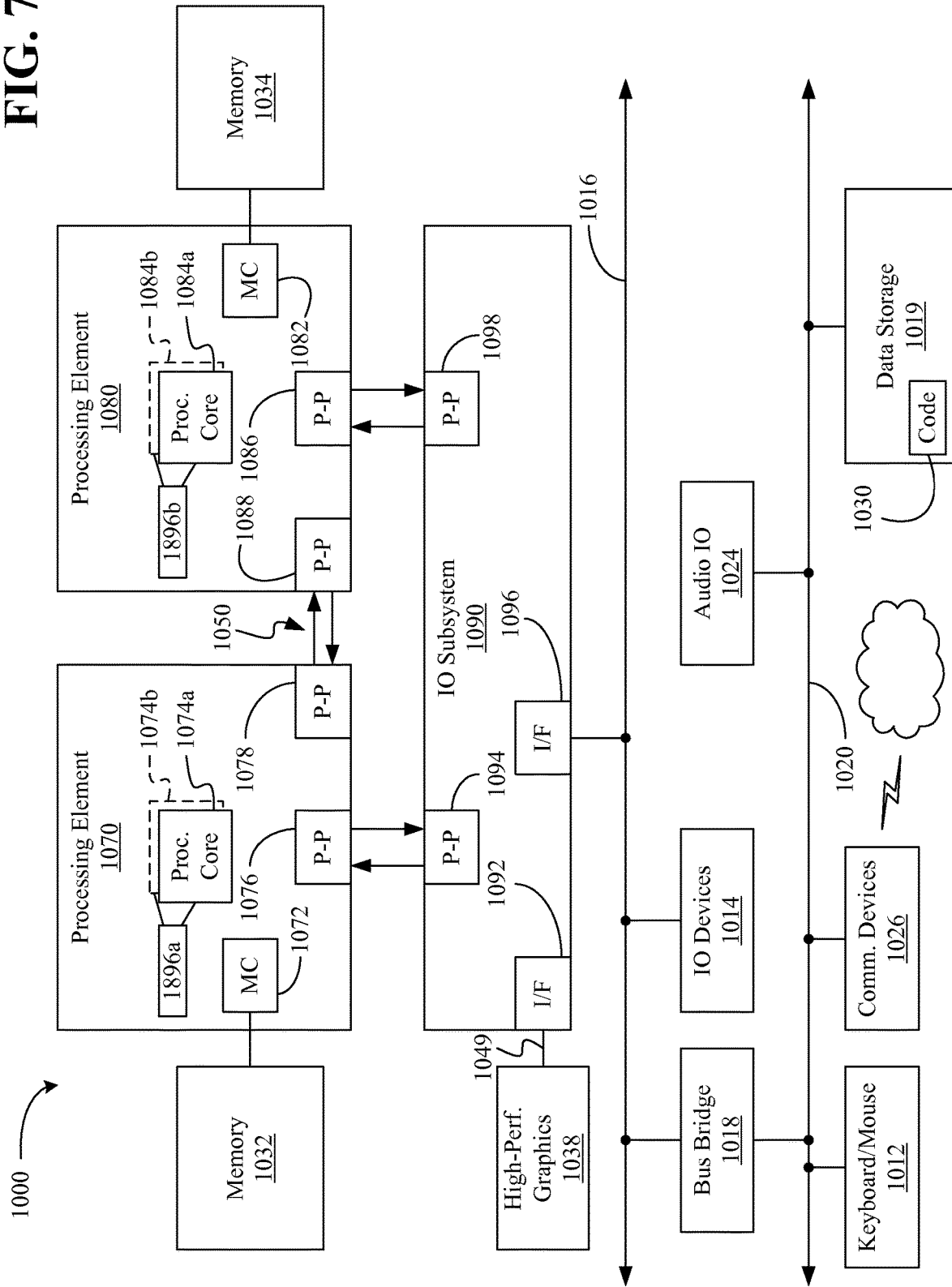

BUDGETING AND QUOTA MANAGEMENT SYSTEM FOR DATA CONSUMPTION

TECHNICAL FIELD

Embodiments generally relate to data consumption management. More particularly, embodiments relate to data consumption budgeting and quota management solutions.

BACKGROUND

Mobile devices may be increasingly able to consume large amounts of data in the form of video streaming, audio streaming and downloads, wherein users may have little or no information regarding device data consumption levels. As a result, a user may encounter extra fees if data consumption levels exceed the data plan limit to which the device is subscribed. Alternatively, the user may underuse data consumption on a device in an effort to avoid such extra fees—effectively overpaying for data service. This difficulty may be even more significant when the device engages in different types of data usage via different connection types, and when billing complexity increases due to the data plan covering multiple devices.

BRIEF DESCRIPTION OF THE DRAWINGS

The various advantages of the embodiments will become apparent to one skilled in the art by reading the following specification and appended claims, and by referencing the following drawings, in which:

FIGS. 3A and 3B are illustrations of examples of advanced setting user interfaces according to embodiments;

FIG. 7 is a block diagram of an example of a system according to an embodiment.

DESCRIPTION OF EMBODIMENTS

Figure 1:
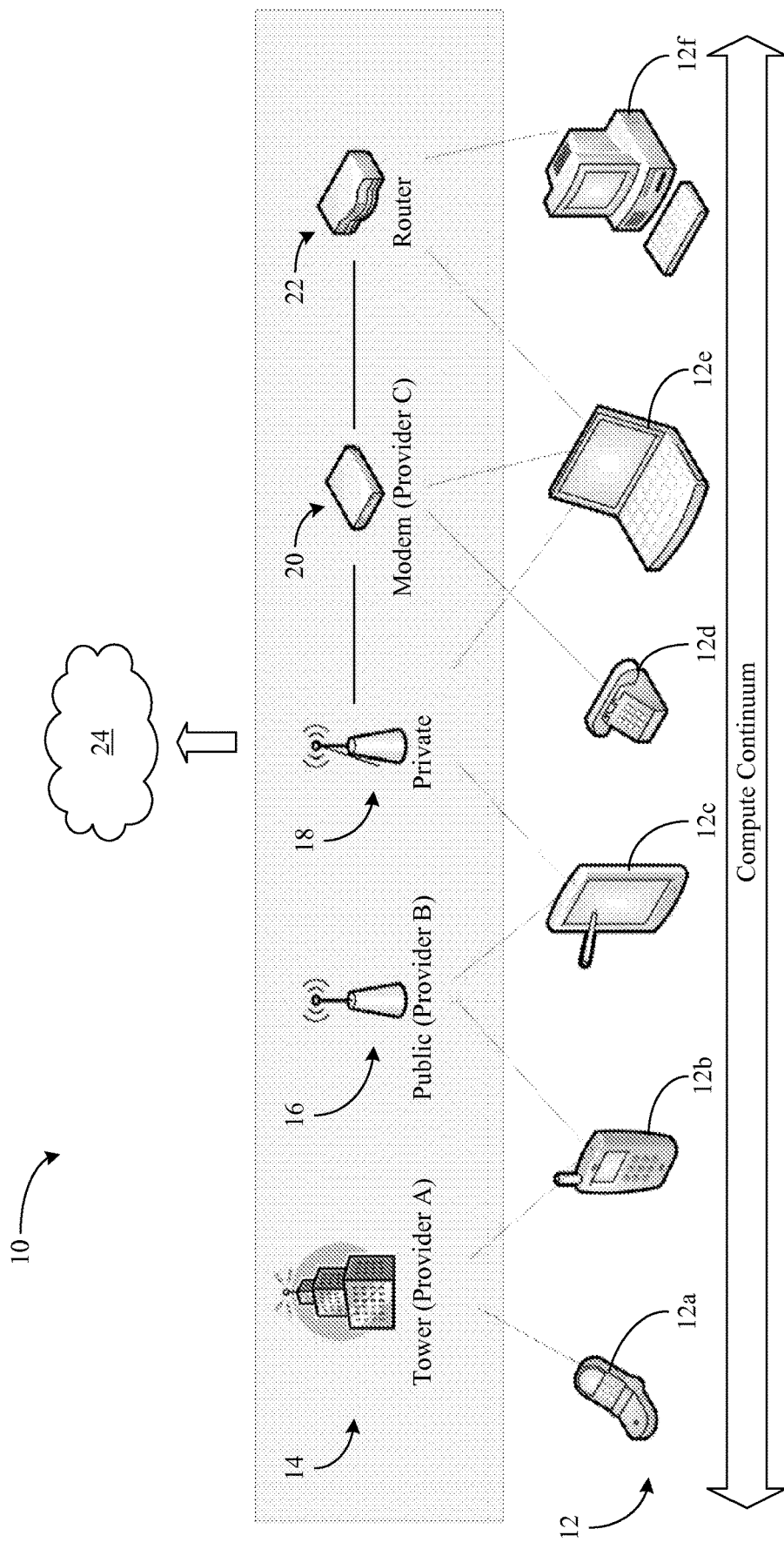
FIG. 1 is a block diagram of an example of a compute continuum according to an embodiment.

Turning now to FIG. 1, a "compute continuum" 10 is shown for a plurality of client devices 12 (12a-12f), wherein the client devices 12 use/consume data via different connection types. For example, a wireless "flip" phone 12a and a wireless "smart" phone 12b may, at a given moment in time, consume data via a connection to a cellular tower 14 (e.g., third generation/3G, fourth generation/4G), wherein the cellular tower 14 may be owned and/or operated by a particular service provider (e.g., cellular service provider, "Provider A") offering a data plan that covers all of the client devices 12. Thus, the connection associated with the cellular tower 14 and Provider A may be "capped" in the sense that the client devices 12 may have a periodic allotment of data usage (e.g., 2 GB per month) that is covered by the base subscription rate. In such a case, if the allotment of data usage is exceeded, the subscriber may be subject to additional "overage" fees and/or costs.

By contrast, the wireless smart phone 12b and a smart tablet 12c may consume data via a public networking connection to a public wireless access point (WAP) 16. In such a case, the public wireless access point 16 might be owned and operated by an entity (e.g., Internet café, restaurant, airport, etc.) having a data plan with a different service provider (e.g., Internet service provider, "Provider B"), wherein overage costs and/or usage allocations of the data plan with Provider B are not passed on to the users of the client devices 12. Accordingly, the public networking connection associated with the public WAP 16 and Provider B may be considered to be "non-capped".

Additionally, the illustrated smart tablet 12c consumes data via a private networking connection to a private WAP 18, which may be in turn connected to a modem 20 associated with another service provider (e.g., cable and/or digital subscriber line/DSL provider, "Provider C"). Similarly, a landline telephone 12d may consume data via a connection to the modem 20, a notebook computer 12e may consume data via a connection to the private WAP 18, the modem 20 and/or a wireless router 22, and a desktop computer 12f may consume data via a connection to the wireless router 22. In the illustrated example, the wireless router 22 is also connected to the modem 20 associated with Provider C, wherein Provider C may also offer a data plan that covers all of the client devices 12. The data plan may have a periodic allotment of data usage (e.g., 250 GB per month) that is covered by the based subscription rate (yet potentially different from the data usage allotment of Provider A). In such a case, the subscriber may be subject to additional overage fees and/or costs if the data usage of the client devices exceeds the allotment. Accordingly, the private networking connection with the modem 20 and Provider C may be considered to be a capped connection. Simply put, the illustrated compute continuum 10 involves different connection types (e.g., "capped" connection, "non-capped" connection) for the client devices 12.

Of particular note is that the data usage by the client devices 12 may also be of a variety of different types. For example, the wireless flip phone 12a may send and/or receive messages such as, for example, e-mail messages, text messages, instant messages, and so forth, via the capped connection to the cellular tower 14, whereas the wireless smart phone 12b might download relatively large files (e.g., installation files, documents) via the non-capped connection to the public WAP 16. Similarly, the smart tablet 12c may conduct video streaming activity via the capped connection to the modem 20 and the notebook computer 12e may conduct audio streaming activity via the capped connection to the modem 20. The data usage by the client devices 12 may therefore range from "high bandwidth" (e.g., downloading activity, streaming activity) to "low bandwidth" (e.g., messaging activity) usage.

As will be discussed in greater detail, a cloud-based budgeting system 24 may provide for establishing and managing data usage budgets that distinguish between usage types and connection types in order to enable the client devices 12 to achieve optimal data usage with respect to the various data plans covering the client devices 12. While the illustrated budgeting system 24 is implemented at the cloud level (e.g., remote server, central data repository, etc.), the budgeting system 24 may be implemented elsewhere in the compute continuum 10 to address privacy, security, architectural, performance, business model and/or marketing concerns.

Figure 2:
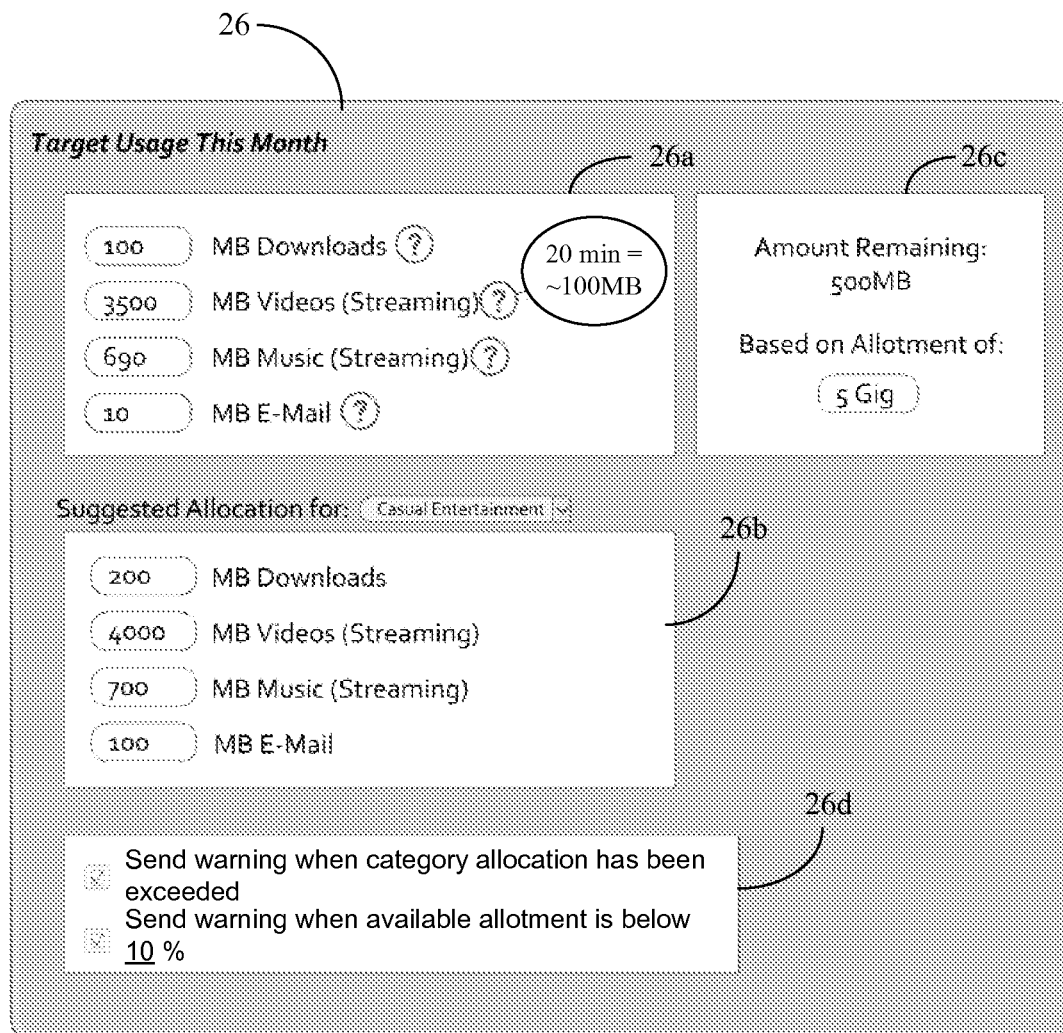
FIG. 2 is an illustration of an example of a budgeting and quota management user interface according to an embodiment.

For example, FIG. 2 shows a user interface 26 (26a-26d) that enables budgets and/or quotas to be established and managed for data consumption on a connection type basis as well as a usage type basis. In the illustrated example, a target usage panel 26a prompts a user for monthly data usage amounts for downloading activity, video streaming activity, music streaming activity and e-mail messaging activity. Thus, the user may set relative targets for different usage types. The illustrated panel 26a also enables the user to determine any assumptions made with regard to the usage amounts chosen (e.g., "20 min=~100 MB"). The user interface 26 may also include a usage mode panel 26b that enables allocations to be suggested based on the usage mode (e.g., casual entertainment, work, vacation, etc.).

Additionally, a summary panel 26c may indicate the total amount of data usage remaining based on a given total allotment. Moreover, a warnings panel 26d may provide the user with the ability to receive various warnings for various events such as, for example, category allocations being exceeded, available allotments falling below a specified level, and so forth. Other warnings may also be configured via the warnings panel 26d. The content of the user interface 26 and/or its individual panels may be specific to a particular service provider/data plan or applicable across all associated service providers/data plans.

Turning now to FIGS. 3A and 3B, more advanced budgeting solutions are shown. In particular, FIG. 3A shows an advanced setting user interface 28 (e.g., tab) that enables the user to configure a capped connection (e.g., 3G/4G) based on the type of usage. For example, the user may be given the option to prevent client devices from engaging in high bandwidth usage activities such as music streaming, video streaming and/or downloads, when the client devices are using a 3G/4G network. Similarly, FIG. 3B shows an advanced setting user interface 30 (e.g., tab) that enables the user to configure a non-capped connection (e.g., public Wireless Fidelity/Wi-Fi) based on the type of usage. For example, the user may be given the option to prevent non-capped (e.g., public Wi-Fi) usage from being added to total consumption calculations, receiving a warning when leaving a non-capped connection while conducting high bandwidth activities, ceasing high bandwidth activities when leaving a non-capped connection, and so forth. Other customizations such as enabling the automatic resumption of high bandwidth activities when re-entering a non-capped connection may also be configured via the advanced settings user interface 30.

Figure 4:
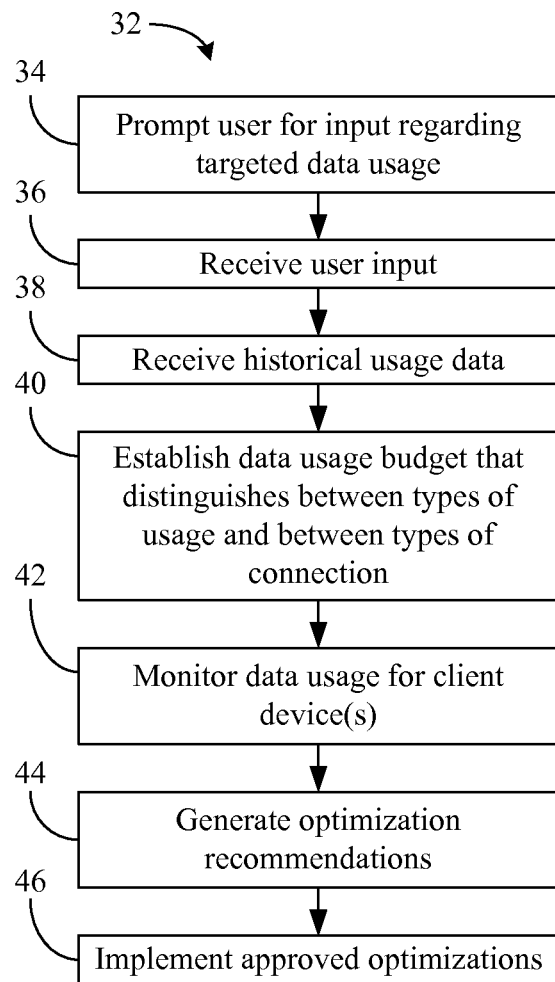
FIG. 4 is a flowchart of an example of a method of budgeting data usage according to an embodiment.

Turning now to FIG. 4, a method 32 of budgeting data usage is shown. The method 32 may be implemented in a computing device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 32 may be written in any combination of one or more programming languages, including an object oriented programming language such as C++ or the like and conventional procedural programming languages, such as the "C" programming language or similar programming languages. Moreover, the method 32 may be implemented using any of the aforementioned circuit technologies.

Illustrated processing block 34 provides for prompting a user for input regarding targeted data usage, wherein user input may be received at block 36. The prompt at block 34 may be generated via a user interface (UI) such as, for example, the user interface 26 (FIG. 2), the user interface 28 (FIG. 3A) and/or the user interface 30 (FIG. 3B), already discussed. Historical usage data may also be received at block 38. The historical usage data may include data related to past data consumption patterns of one or more client devices, wherein the patterns may reflect the type of connection, type of usage, etc., or any combination thereof.

Block 40 may establish a data usage budget that distinguishes between usage types as well as between connection types. For example, the data usage budget might designate target allocations for high bandwidth usage versus low bandwidth usage, capped connections versus non-capped connections, work-related usage versus casual entertainment usage, etc., or any combination thereof. Data usage for one or more client devices may be monitored at block 42. Monitoring the data usage may include, for example, obtaining metering information (e.g., consumption data and related metadata) from the client devices and/or one or more service providers.

Of particular note is that the ability to obtain metering information from multiple client devices that are subject to the same data plan may be particularly advantageous given the multi-device lifestyles led by many individuals, families and groups. Moreover, the ability to obtain metering information from service providers may facilitate the validation and synchronization of metering information obtained from the client devices. In the event that a service provider does not make the metering information readily available, a user might authorize third party periodic access to a web account with the service provider in order to obtain the metering information. The metering information may be pushed by or pulled from the client devices and/or service providers.

Illustrated block 44 provides for generating one or more optimization recommendations based on the monitored data usage. The optimization recommendations may include, for example, a recommendation to cease or otherwise decrease the current data usage by one or more client devices if the current data usage is designated as high bandwidth usage and the current type of connection is a capped connection (e.g., cellular connection, private networking connection). In such a case, it may be inferred that the current activity poses a risk of overage fees. In another example, the optimization recommendations may include a recommendation to begin or otherwise increase data usage if a billing cycle threshold is reached and a data usage threshold is not reached (e.g., the subscriber is about to end a billing cycle with unused data allocation). Block 46 may implement the approved optimizations. One or more of the optimization recommendations may also be "pre-approved" by the user via, for example, one or more warning settings of an offline budgeting and/or quota management process, as already discussed.

Figure 5:
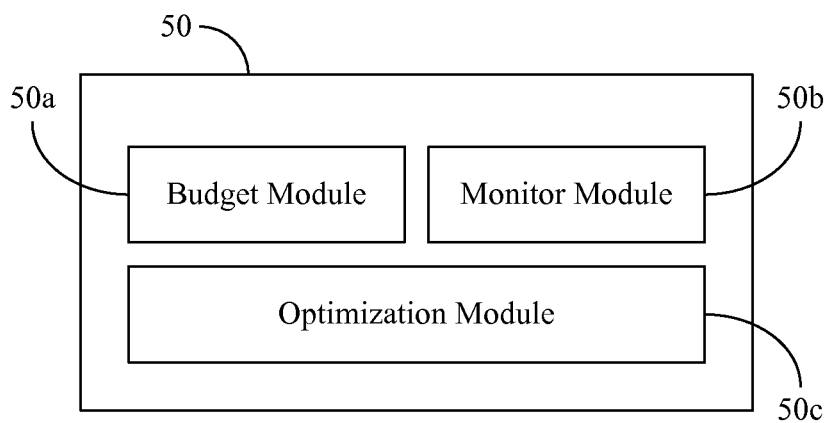
FIG. 5 is a block diagram of an example of a computing device according to an embodiment.

FIG. 5 shows a computing device 50 (50a-50c) to budget data usage. The computing device 50 may include a budget module 50a to establish a data usage budget based on user input and/or historical usage data. The data usage budget may distinguish between usage types and distinguish between connection types. For example, the budget module 50a might designate the usage types as high bandwidth usage and/or low bandwidth usage. The budget module 50a may also designate the connection types as, for example, a capped connection and/or a non-capped connection. The illustrated computing device 50 also includes a monitor module 50b to monitor a data usage of one or more client devices in accordance with the data usage budget In one example, the monitor module 50b obtains metering information from the client devices and/or one or more service providers.

The computing device 50 may also include an optimization module 50c to obtain approval for various optimization recommendations. Approval may be obtained via one or more UI settings and/or warnings. For example, the optimization module 50c may recommend a decrease in current data usage if the type of usage for the current data usage is a high bandwidth usage (e.g., downloading activity, streaming activity) and the type of connection for the current data usage is a capped connection. The optimization module 50c might also recommend an increase in current data usage if a billing cycle threshold is reached and a data usage threshold is not reached, as already discussed. Other optimizations may also be conducted.

Figure 6:
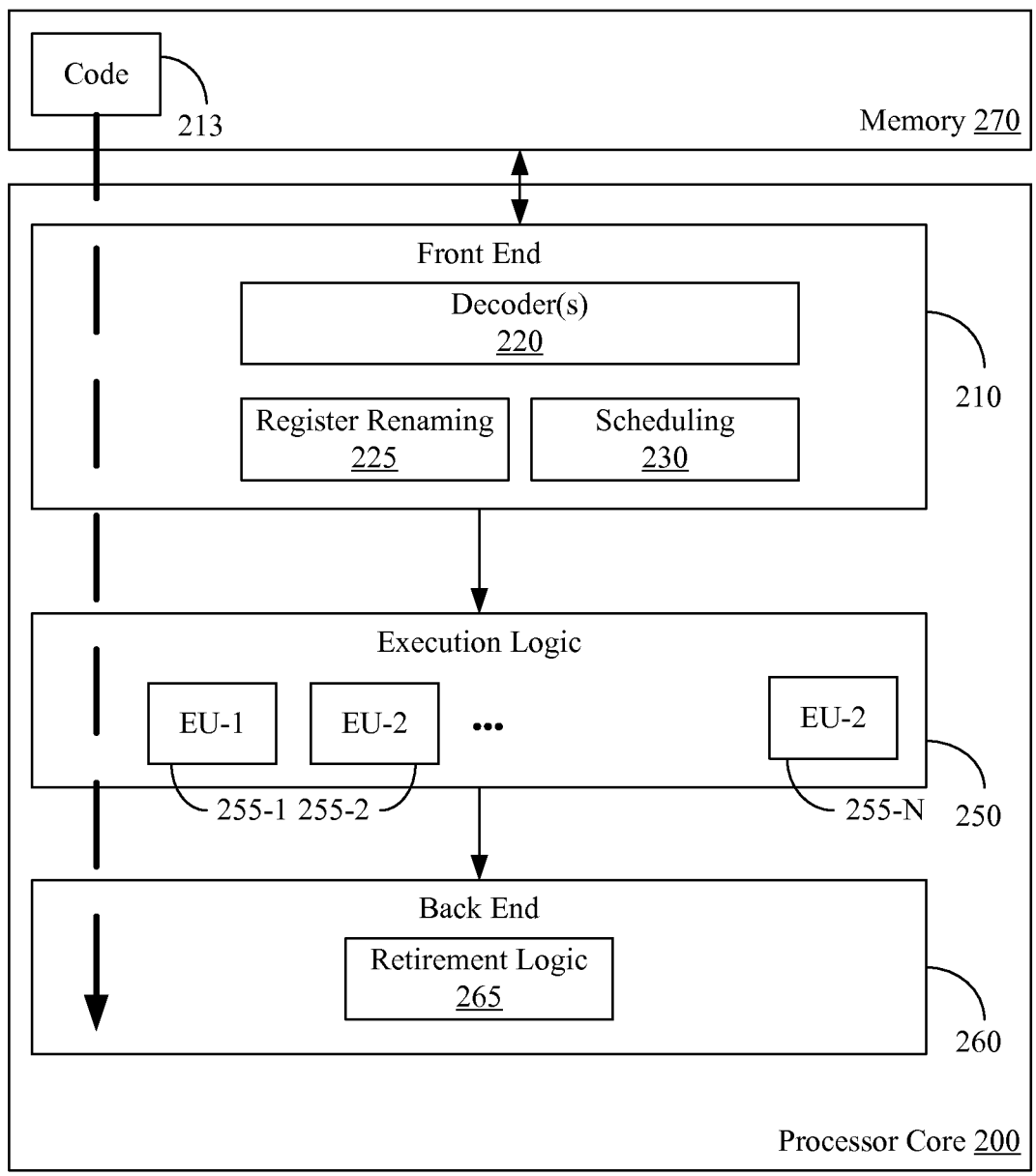
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 32 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (U), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 32 (FIG. 4), and may be similar to the code 213 (FIG. 6), already discussed. Further, an audio I/O 1024 may be coupled to second bus 1020, wherein the audio L/O 1024 may be used to establish a headset connection.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include an apparatus to budget data usage, including a budget module to establish a data usage budget based on one or more of user input and historical usage data. The data usage budget may distinguish between usage types and distinguish between connection types. Additionally, the apparatus may include a monitor module to monitor a data usage of one or more client devices in accordance with the data usage budget.

Example 2 may include the apparatus of example 1, wherein the budget module is to designate the usage types as one or more of a high bandwidth usage and a low bandwidth usage, and wherein the budget module is to designate the connection types as one or more of a capped connection and a non-capped connection.

Example 3 may include the apparatus of example 2, wherein the high bandwidth usage is to correspond to one or more of downloading activity and streaming activity, and wherein the low bandwidth usage is to correspond to messaging activity.

Example 4 may include the apparatus of example 2, wherein the capped connection is to correspond to one or more of a cellular connection and a private networking connection, and wherein the non-capped connection is to correspond to a public networking connection.

Example 5 may include the apparatus of example 2, further including an optimization module to recommend a decrease in current data usage if a type of usage for the current data usage is the high bandwidth usage and a type of connection for the current data usage is the capped connection.

Example 6 may include the apparatus of example 1, further including an optimization module to recommend an increase in current data usage if a billing cycle threshold is reached and a data usage threshold is not reached.

Example 7 may include the apparatus of any one of examples 1 to 6, wherein the monitor module is to obtain metering information from at least one of the one or more client devices to monitor the data usage.

Example 8 may include the apparatus of any one of examples 1 to 6, wherein the monitor module is to obtain metering information from one or more service providers to monitor the data usage.

Example 9 may include a method of budgeting data usage, including establishing a data usage budget based on one or more of user input and historical usage data, wherein the data usage budget distinguishes between usage types and distinguishes between connection types. The method may also provide for monitoring a data usage of one or more client devices in accordance with the data usage budget.

Example 10 may include the method of example 9, further including designating the usage types as one or more of a high bandwidth usage and a low bandwidth usage, and designating the connection types as one or more of a capped connection and a non-capped connection.

Example 11 may include the method of example 10, wherein the high bandwidth usage corresponds to one or more of downloading activity and streaming activity, and wherein the low bandwidth usage corresponds to messaging activity.

Example 12 may include the method of example 10, wherein the capped connection corresponds to one of a cellular connection and a private networking connection, and wherein the non-capped connection corresponds to a public networking connection.

Example 13 the method of example 10, further including recommending a decrease in current data usage if a type of usage for the current data usage is the high bandwidth usage and a type of connection for the current data usage is the capped connection.

Example 14 may include the method of example 9, further including recommending an increase in current data usage if a billing cycle threshold is reached and a data usage threshold is not reached.

Example 15 may include the method of any one of examples 9 to 14, wherein monitoring the data usage includes obtaining metering information from at least one of the one or more client devices.

Example 16 may include the method of any one of examples 9 to 14, wherein monitoring the data usage includes obtaining metering information from one or more service providers.

Example 17 may include at least one computer readable storage medium including a set of instructions which, if executed by a computing device, cause the computing device to the method of any one of examples 9 to 16.

Example 18 may include an apparatus to budget data usage, comprising means for performing the method of any one of examples 9 to 16.

Techniques described herein may therefore enable users to register various data service accounts, such as home high speed cable modem accounts, DSL accounts, cellular network (e.g., 3G/4G) accounts, Wi-Fi accounts, MiFi (My Wi-Fi) accounts, wireless hotspots, etc., and set budgets for high level categories such as watching movies, listening to music, surfing the Internet, c-mail messaging, and so forth. Additionally, suggestions may be offered to users on how to budget their monthly allotment of data usage. For example, suggestions may be based on user shared Internet usage preferences, user profile information, current and past usage data, metrics from other consumers with similar consumption patterns, devices and/or Internet services.

In addition, context aware actions may help users configure data usage as they switch between networks or devices based on the budgets of their various data plans and access to free, unlimited (e.g., non-capped) connections. For example, if a user has movies or software in their queue scheduled for download, the client device may be configured to automatically begin downloading whenever the device is within range of a free public networking connection with unlimited data usage. Alternatively, the client device might be configured to start locally caching data while a user remains below a configured threshold of their data consumption budget on an available data plan.

Moreover, notifications may help users stay on budget through configurable warnings, prompts and automatic enforcement actions. As an example, before viewing a lengthy video, the client device may warn the user that the length of the video will exceed current budget and/or pause the video once the budget is reached. Conversely, notifications may also be used to help a user "splurge" on high bandwidth activities in a timely fashion before a billing period ends, if usage is far below the budget. Notifications may also guide users to switch data plans based on usage habits.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to to the skilled practitioner upon a study of the drawings, specification, and following claims.

We claim:

1. At least one computer-readable storage disk or storage device comprising instructions that, when executed by a mobile device, cause the mobile device to at least:
   present a user interface to receive an input to at least one of prevent or permit download of first bandwidth usage data to the mobile device based on availability of a Wi-Fi connection;
   determine at least one of a cellular connection or the Wi-Fi connection is available to the mobile device;
   prevent download of the first bandwidth usage data to the mobile device via the cellular connection when a cellular data usage threshold has been satisfied;
   permit second bandwidth usage data via the cellular connection, the first bandwidth usage data to use more bandwidth than the second bandwidth usage data, the first bandwidth usage data including video data, the second bandwidth usage data including message data;
   permit the download of the first bandwidth usage data to the mobile device via the Wi-Fi connection; and
   in response to detecting a scheduled queue of the video, a length of the video data exceeding the cellular data usage threshold, automatically download the video data while connected via the Wi-Fi connection and generate a warning when the mobile device disconnects from the Wi-Fi connection and connects via the cellular connection.

2. The storage disk or storage device as defined in claim 1, wherein the instructions, when executed, cause the mobile device to monitor at least one of the first bandwidth usage data or the second bandwidth usage data of the mobile device.

3. The storage disk or storage device as defined in claim 2, wherein the instructions, when executed, cause the mobile device to generate an alert in response to detecting satisfaction of the cellular data usage threshold of at least one of the first bandwidth usage data or the second bandwidth usage data.

4. The storage disk or storage device as defined in claim 2, wherein the instructions, when executed, cause the mobile device to generate a user-selectable option in response to detecting satisfaction of the cellular data usage threshold of at least one of the first bandwidth usage data or the second bandwidth usage data.

5. The storage disk or storage device as defined in claim 2, wherein the instructions, when executed, cause the mobile device to at least one of increase or decrease at least one of the first bandwidth usage data or the second bandwidth usage data in response to determining the cellular data usage threshold of at least one of the first bandwidth usage data or the second bandwidth usage data has been satisfied.

6. The storage disk or storage device as defined in claim 1, wherein the instructions, when executed, cause the mobile device to distinguish data usage types as at least one of downloading data, the video data, video streaming data, music streaming data, or the message data.

7. The storage disk or storage device as defined in claim 1, wherein the instructions, when executed, cause the mobile device to cease the video data when the mobile device is connected to only the cellular connection.

8. The storage disk or storage device as defined in claim 7, wherein the instructions, when executed, cause the mobile device to:
   identify the first bandwidth usage data as high bandwidth activity; and
   identify the second bandwidth usage data as low bandwidth activity.

9. A mobile device comprising:
   memory including instructions;
   at least one processor to execute the instructions to:
      cause presentation of a user interface to receive an input to permit download of first bandwidth usage data to the mobile device via a cellular connection based on availability of a Wi-Fi connection;
      determine the Wi-Fi connection is available to the mobile device;
      when a cellular data usage threshold has been satisfied, prevent download of the first bandwidth usage data to the mobile device via the cellular connection based on the input;
      permit download of second bandwidth usage data via the cellular connection, the first bandwidth usage data to use more bandwidth than the second bandwidth usage data, the first bandwidth usage data including video data, the second bandwidth usage data including message data;

permit the download of the first bandwidth usage data to the mobile device via the Wi-Fi connection; and in response to detecting a scheduled queue of the video, a length of the video data exceeding the cellular data usage threshold, automatically download the video data while connected via the Wi-Fi connection and generate a warning when the mobile device disconnects from the Wi-Fi connection and connects via the cellular connection.

10. The mobile device as defined in claim 9, further including a monitor to monitor at least one of the first bandwidth usage data or the second bandwidth usage data.

11. The mobile device as defined in claim 10, wherein the at least one processor is to generate an alert in response to determining the cellular data usage threshold of at least one of the first or second bandwidth usage data has been satisfied.

12. The mobile device as defined in claim 10, wherein the at least one processor is to cause the user interface to present a user-selectable option in response to determining the cellular data usage threshold of at least one of the first or second bandwidth usage data has been satisfied.

13. The mobile device as defined in claim 10, wherein the at least one processor is to at least one of increase or decrease data usage of the mobile device in response to determining the cellular data usage threshold has been satisfied.

14. The mobile device as defined in claim 9, wherein the at least one processor is to distinguish data usage types as at least one of download data, the video data, video streaming data, music streaming data, or the message data.

15. The mobile device as defined in claim 9, wherein the at least one processor is to cease the video data when the mobile device is accessible to the cellular connection and not accessible to the Wi-Fi connection.

16. The mobile device as defined in claim 15, wherein the at least one processor is to:

identify the first bandwidth usage data as a high bandwidth activity; and identify the second bandwidth usage data as a low bandwidth activity.

17. A mobile device to manage network usage, the mobile device comprising:

means for receiving a user input indicating whether to prevent download of first bandwidth usage data to the mobile device via a cellular connection based on availability of a Wi-Fi connection; and means for controlling usage of the cellular connection and the Wi-Fi connection, the controlling means to:

based on the user input, prevent download of the first bandwidth usage data to the mobile device via the cellular connection when a cellular data usage threshold has been satisfied;

permit second bandwidth usage data via the cellular connection, the first bandwidth usage data to use more bandwidth than the second bandwidth usage data, the first bandwidth usage data including video data, the second bandwidth usage data including message data;

permit the download of the first bandwidth usage data to the mobile device via the Wi-Fi connection; and in response to detecting a scheduled queue of the video, a length of the video data exceeding the cellular data threshold, automatically download the video data while connected via the Wi-Fi connection and generate a warning when the mobile device disconnects from the Wi-Fi connection and connects via the cellular connection.

18. The mobile device as defined in claim 17, further including means for monitoring data usage of the mobile device.

19. The mobile device as defined in claim 18, wherein the controlling means is to generate an alert in response to detecting satisfaction of the cellular data usage threshold.

20. The mobile device as defined in claim 18, wherein the controlling means is to generate a user-selectable option in response to detecting satisfaction of the cellular data usage threshold.

21. The mobile device as defined in claim 18, wherein the controlling means is to at least one of increase or decrease the data usage in response to determining the cellular data usage threshold has been satisfied.

22. The mobile device as defined in claim 18, wherein the controlling means is to identify the data usage as at least one of the download data, the video data, video stream data, music stream data, or the message data.

23. The mobile device as defined in claim 19, wherein the controlling means is to cease the video data when the mobile device has access to only the cellular connection.

* * * * *